United States Patent [19]

Urkowitz

[11] Patent Number: 5,157,403

[45] Date of Patent: Oct. 20, 1992

[54] NOISE CORRECTION IN RADARS FOR DIFFUSE TARGETS

[75] Inventor: Harry Urkowitz, Philadelphia, Pa.

[73] Assignee: General Electric Co., Moorestown, N.J.

[21] Appl. No.: 770,846

[22] Filed: Oct. 4, 1991

[51] Int. Cl.$^5$ .......................................... G01S 13/526
[52] U.S. Cl. .................................. 342/111; 342/115; 342/203
[58] Field of Search ........................ 342/111, 115, 203

[56] References Cited

U.S. PATENT DOCUMENTS

| | | | |
|---|---|---|---|
| 3,140,486 | 7/1964 | Gillmer | 342/111 X |
| 4,219,812 | 8/1980 | Rittenbach | 342/111 X |

OTHER PUBLICATIONS

An article entitled "Objective Determination of the Noise Level in Doppler Spectra" by Hildebrand, et al. appeared at pp. 808–811 in the Journal of Applied Meteorology, vol. 13, Oct. 1974.

Primary Examiner—T. H. Tubbesing
Attorney, Agent, or Firm—W. H. Meise; S. A. Young; C. A. Nieves

[57] ABSTRACT

A ranging system such as a radar system transmits signal pulses toward a diffuse target, such as an atmospheric disturbance. The echoes are processed by quantizing and by doppler filtering to produce a plurality of frequency components representing the radial velocities of various parts of the disturbance, which components are expected to be contaminated by an unknown amount of noise. The noise value is established by squaring the echo signals to produce power-representative signals. The signal samples are ranked according to amplitude, and one or more of the largest-value samples are discarded to reduce the order of the sample set. A Kolmogorov-Smirnov test statistic is generated and compared with a threshold established by the desired confidence level. If the test statistic exceeds the threshold, the order of the sample set is again reduced, and the test statistic again compared with the threshold. The noise level is deemed to be represented by the current reduced-order set when the test statistic does not exceed the threshold.

14 Claims, 5 Drawing Sheets

CONFIDENCE LEVEL 1 - $\alpha$

|  |  | .80 | .90 | .95 | .98 | .99 |  |  | .80 | .90 | .95 | .98 | .99 |
|---|---|---|---|---|---|---|---|---|---|---|---|---|---|
| $N_i =$ | 1 | .900 | .950 | .975 | .990 | .995 | $N_i =$ | 21 | .226 | .259 | .287 | .321 | .344 |
|  | 2 | .684 | .776 | .842 | .900 | .929 |  | 22 | .221 | .253 | .281 | .314 | .337 |
|  | 3 | .565 | .636 | .708 | .785 | .829 |  | 23 | .216 | .247 | .275 | .307 | .330 |
|  | 4 | .493 | .565 | .624 | .689 | .734 |  | 24 | .212 | .242 | .269 | .301 | .323 |
|  | 5 | .447 | .509 | .563 | .627 | .669 |  | 25 | .208 | .238 | .264 | .295 | .317 |
|  | 6 | .410 | .468 | .519 | .577 | .617 |  | 26 | .204 | .233 | .259 | .290 | .311 |
|  | 7 | .381 | .436 | .483 | .538 | .576 |  | 27 | .200 | .229 | .254 | .284 | .305 |
|  | 8 | .358 | .410 | .454 | .507 | .542 |  | 28 | .197 | .225 | .250 | .279 | .300 |
|  | 9 | .339 | .387 | .430 | .480 | .513 |  | 29 | .193 | .221 | .246 | .275 | .295 |
|  | 10 | .323 | .369 | .409 | .457 | .489 |  | 30 | .190 | .218 | .242 | .270 | .290 |
|  | 11 | .308 | .352 | .391 | .437 | .468 |  | 31 | .187 | .214 | .238 | .266 | .285 |
|  | 12 | .296 | .338 | .375 | .419 | .449 |  | 32 | .184 | .211 | .234 | .262 | .281 |
|  | 13 | .285 | .325 | .361 | .404 | .432 |  | 33 | .182 | .208 | .231 | .258 | .277 |
|  | 14 | .275 | .314 | .349 | .390 | .418 |  | 34 | .179 | .205 | .227 | .254 | .273 |
|  | 15 | .266 | .304 | .338 | .377 | .404 |  | 35 | .177 | .202 | .224 | .251 | .269 |
|  | 16 | .258 | .295 | .327 | .366 | .392 |  | 36 | .174 | .199 | .221 | .247 | .265 |
|  | 17 | .250 | .286 | .318 | .355 | .381 |  | 37 | .172 | .196 | .218 | .244 | .262 |
|  | 18 | .244 | .279 | .309 | .346 | .371 |  | 38 | .170 | .194 | .215 | .241 | .258 |
|  | 19 | .237 | .271 | .301 | .337 | .361 |  | 39 | .168 | .191 | .213 | .238 | .255 |
|  | 20 | .232 | .265 | .294 | .329 | .352 |  | 40 | .165 | .189 | .210 | .235 | .252 |

FIG. 6

NOISE CORRECTION IN RADARS FOR DIFFUSE TARGETS

BACKGROUND OF THE INVENTION

This invention relates to radar systems, and especially to schemes for reducing the noise in echoes returned from diffuse targets such as weather phenomena.

The use of radar to detect major weather phenomena such as thunderstorms is well known to the public at large through television weather reports. Weather researchers and air traffic controllers use radar to detect and track low-amplitude or low level echoes from disturbances less severe than thunderstorms or precipitation. Such low level disturbances include small changes in the dielectric constant or index of refraction of disturbed atmosphere, believed to be attributable to slight temperature, humidity, moisture or pressure variations, but which may also be attributable to the presence of insects, or dust associated with the disturbance.

Copending patent application Ser. No. 07/685,792, filed Apr. 16, 1991 in the name of Urkowitz, describes an air traffic control radar which is also adapted for detecting low-amplitude weather phenomena. As described therein, a pulse doppler radar includes range sidelobe reduction following the doppler filtering, in order to reduce range errors. Another arrangement for reducing range sidelobes in a pulse doppler radar, including the transmission of complementary-sequence pulses, with matched filtering following the doppler filtering, is described in copending application Ser. No. 07/734,003 filed Jul. 22, 1991 in the name of Urkowitz.

FIG. 1 is a simplified block diagram of a portion of a radar system as generally described in the abovementioned Urkowitz patent applications. In its simplified form, it may be taken as corresponding to the prior art. In general, radar system 10 of FIG. 1 includes a transmit-receive multiplexer (TR) apparatus 14. A transmitter (TX) 16 and a receiver 18 are connected to antenna 12 by way of TR 14. Receiver 18 is connected to transmitter 16 for receiving reference local oscillator (LO) signals. An analog-to-digital converter (ADC) 20 is connected to the output of receiver 18, and is in turn connected to a digital signal processor 22. In operation, transmitter 16 produces sequences of pulses which are transmitted by antenna 12 in the form of electromagnetic radiation or signal, represented as 24. The radiation reaches a weather phenomenon designated generally by 26, which reflects signal echoes back toward radar system 10 and its antenna 12. Phenomenon 26 may be turbulent, with internal fluid flow in whorls, illustrated by arrows 25. Antenna 12 couples the received echo signals by way of TR 14 to receiver 18. Receiver 18 also receives local oscillator (LO) signal from transmitter 16 to aid in its processing. The received signals are sampled and converted into digital form (parallel or serial) in ADC 20. The digital signals are applied to a digital signal processor (DSP) 22 for processing the signals to extract information therefrom. Many of the processes which are performed in DSP 22 are performed by algorithms rather than by dedicated hardware in modern radar systems, but the operation of the algorithms is often described in terms of their analog hardware equivalents. Thus, for example, the discrete Fourier transform (DFT) is often used to identify the frequency components of a series of pulses. This process may be described by its analog equivalent, which is applying the analog signal to a bank of narrow-band filters. The signals processed in DSP 22 by DFT and by other processes are then made available for further processing, such as generating a surveillance display, activating alarms, and the like. Such additional processing steps are well known in the art and are not elaborated herein.

The extremely low amplitudes of the echoes from weather phenomena creates difficulties in identifying returns from the targets and in distinguishing them from atmospheric and radar system noise. If the amplitude of the atmospheric and system noise were known beforehand, a fixed amount could be subtracted from each signal sample, to thereby effectively render the radar noise-free. However, the noise level of the radar system (the transmitter and the receiver) itself changes from time to time, and atmospheric noise effects may change drastically from moment to moment. Such changes may occur, for example, as a result of arc discharges such as automobile spark plugs or electric motors, which produce broadband impulse noise.

An article entitled "Objective Determination of the Noise Level in Doppler Spectra", by Hildebrand and Sekhon, which was published in the Journal of Applied Meteorology, October 1974, pages 808-811 (the HS article or HS), describes a noise reduction scheme which may be represented by FIG. 2. FIG. 2 represents one of the first stages of processing in DSP 22 of the radar of FIG. 1. In FIG. 2, digitized echoes resulting from sequences of transmitted pulses are applied to a doppler filter bank 210, including filters $f_1, f_2, \ldots f_n$, which separate signals representative of the echoes or returns from a weather phenomenon or other target into their various frequency components $f_1, f_2, \ldots f_n$. These doppler frequency components represent echoes from portions of the diffuse target which are moving with different radial velocities relative to the radar system. If a single solid object such as a cannon-ball were moving with a fixed radial velocity relative to the radar, only one output signal, representing one radial velocity, would be expected from doppler filter bank 210. However, a diffuse target with turbulence may have different portions moving with different velocities, and these portions contribute to the overall doppler signal at the output of filter 210.

In FIG. 2, the output of each filter $f_1, f_2, \ldots f_n$ of doppler filter bank 210 is applied to the noninverting (+) input of a corresponding summing circuit 212. Thus, filter portion $f_1$ of doppler filter bank 210 is coupled to the noninverting input of a summing circuit $212^1$, filter $f_2$ is coupled to a summing circuit $212^2$, ... and the $n^{th}$ filter $f_n$ is coupled to a summing circuit $212_n$. A noise determination or noise calculation circuit 214 is connected to the output of each doppler filter of filter bank 210 and to the inverting (−) input of the corresponding summing circuit 212. Thus, a noise calculation circuit 214 is connected to the output of filters $f_1, f_2, \ldots f_n$, and calculates the overall noise in channel 1, and applies the calculated noise in common to the inverting inputs of the summing circuits $212^1 \ldots 212^n$. Within each summing circuit 212, the calculated noise is subtracted from the signal-plus-noise applied to its noninverting input, to thereby produce ideally noise-free signal.

The Hildebrand, et al. (HS) article describes a method of determining the noise level which depends upon the physical properties of white and Gaussian noise. The HS method for determining the noise level is described in conjunction with FIGS. 3a–3h.

The output signal from ADC 20 of FIG. 1 is a sequence of pulse-to-pulse complex values from each range bin. FIG. 3a plots received signal amplitude x(f) versus frequency f at the outputs of the doppler filters. Plot 310 represents a possible signal amplitude spectrum within a single range bin resulting from transmission of a sequence of pulses. Curve 310 of FIG. 3a, when squared, represents the power density spectrum S(f) of the received signal. FIG. 3b plots S(f), the power density spectrum of the signal across the doppler channels of FIG. 2. The value of S(f) at any point may be given by $$S(f) \propto e^{-(f-f_d)^2/2\sigma^2_f} \quad (1)$$

where $\propto$ represents proportionality, f is the frequency $f_d$ is the doppler frequency and $\sigma_f$ is the spread or standard deviation. Curve 312 is generally bell-shaped. Within any frequency increment $f_i$ of FIG. 3b, the mean-square value of the power density spectrum represents the power within that frequency increment, and the sum of the incremental powers represented by all such frequency increments represents the signal power in the doppler channels. The spread or standard deviation of curve 312 of FIG. 3b is represented by arrow $\sigma_f$. Ordinarily, each frequency increment $f_i$ corresponds to the bandwidth of one doppler filter.

The signal component of FIG. 3b is accompanied by a constant noise power density spectrum $N_o$, illustrated in FIG. 3c by plot 314. The magnitude of $N_o$ is not known, but is expected to vary with time. Plot 314 of FIG. 3c represents the constant noise power density spectrum across all the doppler filter channels having a cumulative bandwidth F. The spectral variance of the noise spectrum of FIG. 3b is given by $$\sigma_N^2 = F^2/12 \quad (2)$$

where F is the pulse recurrence frequency (PRF). Equation 2 corresponds to the moment of inertia of the rectangle defined by plot 314 about center frequency F/2 of FIG. 3b. Plot 316 of FIG. 3d represents the sum of the power density spectrums of FIGS. 3b and 3c, which is the echo signal plus noise within one range bin resulting from a sequence of pulses.

As a result of the use of digital signal processing, the signals represented in FIGS. 3a, 3b, 3c and 3d are actually time and amplitude-quantized. Further, the discrete Fourier transform (DFT) by which the doppler filtering is actually accomplished produces discrete sample points which generally number $2^N$. For example, the number of DFT sample points might be 16, 32. . . . FIG. 3e plots a plurality of points which might be produced by a DFT in response to signal equivalent to 316 of FIG. 3d. For simplicity, only 8 points, numbered from 1 to 8, are represented in FIG. 3d, rather than the larger number which would ordinarily be used. These points represent samples of analog plot 316 of FIG. 3d, taken at various frequencies.

In the prior-art HS method for calculating noise in each channel, the samples represented as samples 1-8 in FIG. 3e are ordered according to amplitude, or in effect laid out in a line, with smallest-amplitude samples 1 and 8 at one end, and largest-amplitude sample 5 at the other end. FIG. 3f represents such an ordering of samples, with highest amplitudes near the top and lowest amplitude near the bottom. For the purpose of calculating the noise level, one or more of the largest-amplitude samples is discarded. Since only eight samples are illustrated in the simplified example, only one sample is deleted. The largest-amplitude sample, which is sample 5, is deleted to make a reduced-order set of samples (periodogram). This is the equivalent of procrustinating the quantized plot of FIG. 3e by truncating the plot at a level illustrated by dashed line 318, to produce a plot which, if not quantized, might look like plot 322 of FIG. 3g.

When one or more samples of the quantized plot of FIG. 3e, such as sample 5, are discarded, the remaining samples have a "frequency gap", which happens to be near fd in FIG. 3e. According to the HS method for calculating the noise, the frequency gap is "closed" to form a continuous spectrum, illustrated as 324 in FIG. 3h. A test is then performed to see if the remaining spectrum has the characteristics attributed to white noise. This test involves the calculation of two ratios, R1 and R2, where $$R_1 = \sigma^2_N/\sigma^2 \quad (3)$$

$$R_2 = P^2/pQ \quad (4)$$

The quantity $\sigma_N^2$, the presumed noise spectral variance, is given by equation (2). The other quantities are expressed as $$\sigma^2 = (\Sigma f^2_n S_n / \Sigma S_n) - (\Sigma f_n S_n / \Sigma S_n)^2 \quad (5)$$

$$P = \Sigma S_n / N \quad (6)$$

$$Q = \Sigma(S^2_n/N) - P^2 \quad (7)$$

where $f_n$ is the frequency of the specific one of the N doppler filter outputs $S_n$ is the value of estimated spectral density at frequency $f_n$ F is the frequency spread of the spectrum, N is the number of independent spectral densities or doppler filters in the filter bank, and p is the number of spectral lines over which a moving average is taken.

Ratios $R_1$ and $R_2$ are calculated after the reduction in the order of the set of samples. If the HS test is not met, one or more of the largest amplitude samples are deleted from the reduced-order set, to produce a new reduced-order set, and the test is applied again. The procedure of reducing the order and performing the test is performed as many times as necessary. According to the HS test, the remaining samples represent white noise when both ratios $R_1$ and $R_2$ equal unity.

When $R_1$ and $R_2$ both sufficiently close to unity, the samples remaining in the current reduced-order sample set are taken to represent the noise level. The resulting noise spectral density level is subtracted from the received samples in each channel, to produce what is expected to be a more accurate representation of the echo signal. This calculation and subtraction is performed for each range bin.

The HS scheme suffers from both theoretical and practical problems. The theoretical problem is that the HS calculation assumes that the noise is Gaussian. This assumption may not be true, especially when the noise originates from non-thermal phenomenon. Non-thermal phenomena might include phase noise, possibly attributable to timing jitter, or it might include impulse noise such as automobile ignition noise, lightning, electric motors or the like. Also, the ratios $R_1$ and $R_2$ are unlikely to reach exactly unity at the same time. The practical problem which then arises is how to determine how close each must be to unity in order for the condition to be deemed to be fulfilled, and the determination of the confidence level for whatever deviation from unity is selected. Thus, the HS test provides no standards by which a time for completion of the iterations can be determined.

SUMMARY OF THE INVENTION

A radar system transmits pulse signals and receives echoes. The echoes are doppler-filtered into a plurality of spectral components. The sampled signal components in each channel are magnitude squared to produce quantities proportional to the power density spectrum. The samples are ordered according to amplitude, and the ordered set is truncated. A Kolmogorov-Smirnov (KS) test statistic is calculated from the samples, and the statistic is compared with a threshold which depends upon the desired confidence level. The ordering, truncation and calculation are repeated until the test statistic is less than or equal to the threshold, whereupon the samples of the reduced-order set are deemed to be known with the desired confidence level. The test statistic is the maximum deviation ($T_{1i}$) of a quotient $F_i(k)$ from the slope $k/N_i$ of a straight line. Quotient $F_i(k)$ is the quotient of the running summation of the ordered spectral power density $S_{(r)}$ of the reduced-order set divided by the summation of the entire spectral power density $S_{(r)}$ of the reduced-order set. The threshold $w_{1-\alpha}$ may be extracted from a table or calculated based upon the desired confidence level.

DESCRIPTION OF THE DRAWING

FIG. 6 tabulates values of $w_{1-\alpha}$ as a function of $N_i$, the number of samples in the reduced-order set, and the desired confidence level $1-\alpha$.

DESCRIPTION OF THE INVENTION

Figure 2:
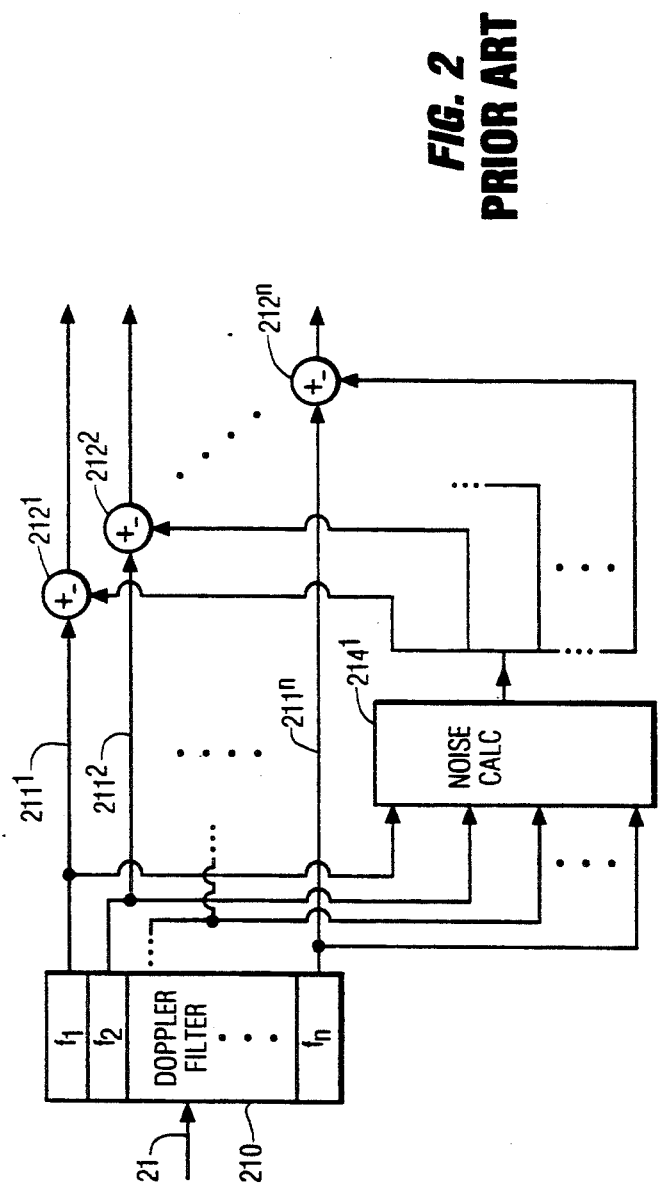
FIG. 2 is a block-diagram representation of the overall scheme of a prior-art noise reduction arrangement.
Figure 3A:
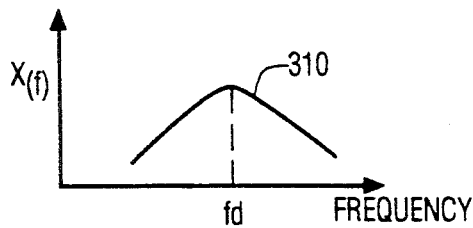
FIGS. 3a-3h, illustrate various steps in the prior-art noise reduction scheme.
Figure 3B:
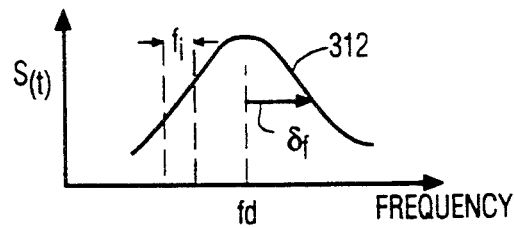
Figure 3C:
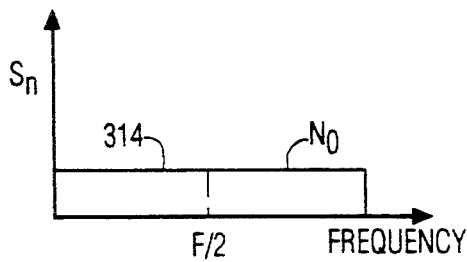
Figure 3D:
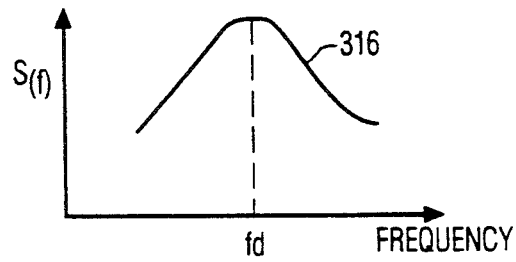
Figure 3E:
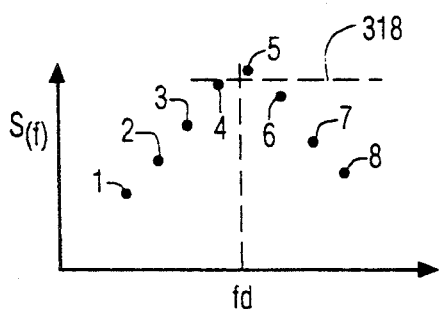
Figure 3F:
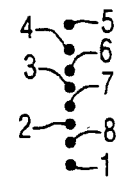
Figure 3G:
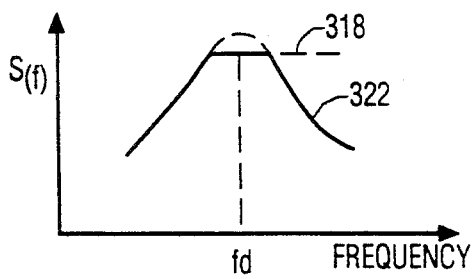
Figure 3H:
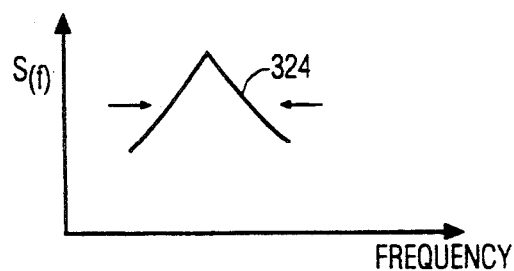
Figure 4:
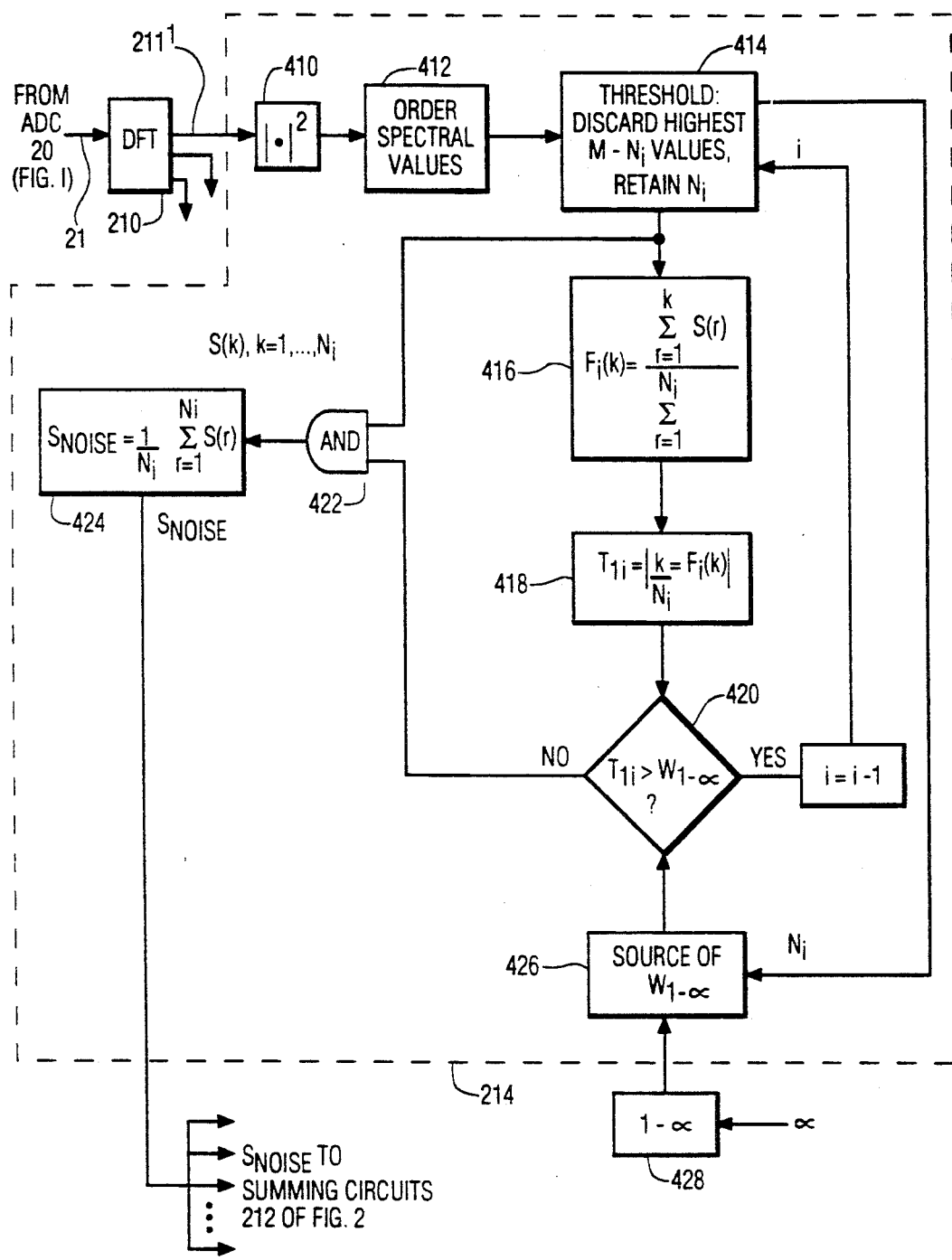
FIG. 4 is a block diagram, equivalent to a flow chart, of noise calculations in accordance with the invention.

FIG. 4 illustrates a noise reduction flow chart or system according to the invention. Elements of FIG. 4 corresponding to those of FIG. 2 are designated by like reference numerals. In FIG. 4, the outputs of the doppler filters of doppler filter bank 210 are coupled to a noise calculation block 214. In FIG. 4, the complex values x(f) are applied from the doppler filters of filter bank 210 by way of data paths 211 to a squaring block 410. Squaring block 410 of FIG. 4 squares the signal samples x(f) to produce points S(fn), n=1, ... M of a power density spectrum, where $f_n$ is the nth discrete frequency of the periodogram or spectrogram, which represents a shift of the transmitted carrier frequency, corresponding to the step illustrated in FIG. 3e. Block 412 represents the ordering of the spectral values S(fn) to form an ordered periodogram, corresponding to the step illustrated in FIG. 3f.

The values of the ordered periodogram may be represented by $S_{(k)}$, such that $$S_{(k)}:S_{(1)} \leq S_{(2)} \leq \ldots \leq S_{(M)} \quad (8)$$

The signals, ordered by amplitude, are applied to a block 414 of FIG. 4, which represents the discarding the $M-N_i$ of the largest samples, leaving a reduced-order periodogram or set of $N_i$ samples $$S_{(1)}, S_{(2)}, S_{(3)}, \ldots S_{(Ni)} \quad (9)$$

where the number of different values may be less than $N_i$, as for example if some, or all, the values $S_{(1)}, S_{(2)}, \ldots S_{(Ni)}$ were equal in amplitude.

The initial value of $N_i$ is somewhat arbitrary, but should be larger than the number of spectral components believed to arise solely from noise. In the absence of experience which might be indicative of an appropriate value for $N_i$, it may be chosen to be equal to M.

Figure 5A:
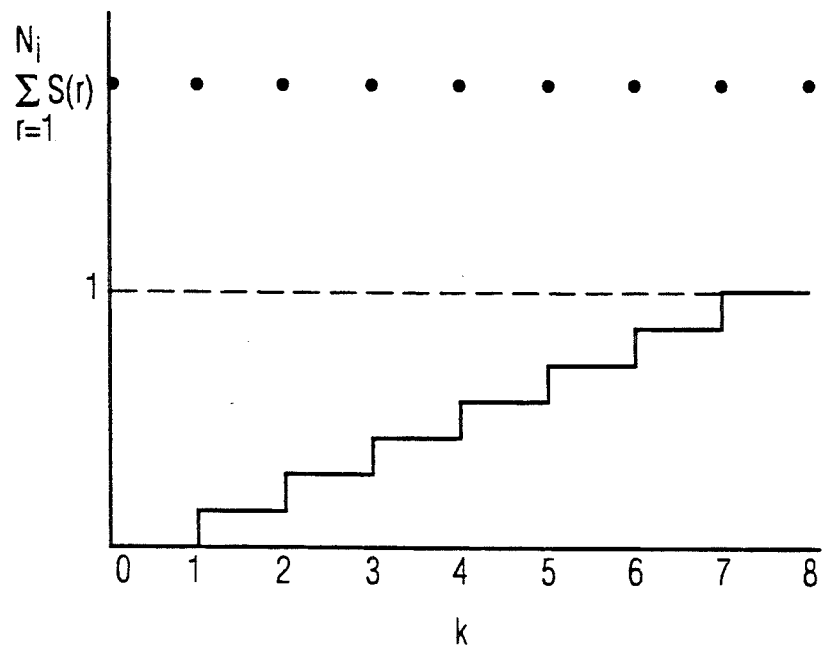
FIGS. 5a and 5b are plots of the summation of the measured power density spectrum at the outputs of the doppler filters, in the absence of an in the presence of signal, respectively.

The $i^{th}$ empirical spectral distribution function $F_i(k)$ is determined in block 416 of FIG. 4 from the reduced-order periodogram $$F_i(k) = \sum_{r=1}^{k} S_{(r)} / \sum_{r=1}^{N_i} S_{(r)} \quad (10)$$

where r is a running variable, taking on values between zero and k, and k has a maximum value of $N_i$. Equation 10 represents the cumulative frequency power distribution, normalized to its maximum value. Thus, the denominaor of equaltion 10 represents a normalizing factor, and the numerator takes on different values for each value of k. For example, if k=1, the sum $S_{(r)}$ over the interval r=1 to 1 is a sum taken over a single value and is thus just $S_{(r)}$. This value is plotted in FIG. 5a for k=1. When k=2, the numerator of equation 10 is the value of the summation of $S_{(r)}$ from r=1 to r=2. This value is normalized by dividing by the denominator, which is the sum of $S_{(r)}$ over all values of r from r=1 to r=$N_i$. The denominator of equation 10 is designated $$\sum_{r=1}^{N_i} S_{(r)}$$

in FIG. 5a, and has the same value for all k. The numerator of equation 10 is an increasing sum, which reaches its highest value for k=$N_i$, at which time the numerator and denominator are equal. Equation 10 therefore is a stairstep representing the sum or cumulation of the power density spectra, normalized to a maximum value of unity, of the $N_i$ samples of the reduced-order set.

Figure 5B:
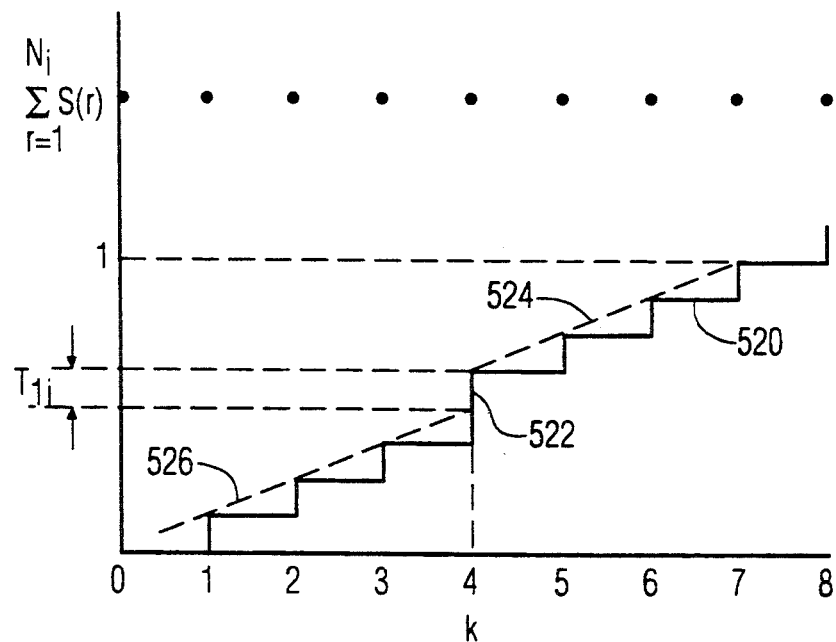

If the actual power density being sampled is that of noise alone, the measured power density spectrum in each increment of k would tend to be equal or near the value obtained in any other value of k. The sum would tend to be a regular "staircase" as illustrated in FIG. 5a. Fluctuations, however, inevitably causes some departure from this "staircase" function. If each channel contains only noise arising from a uniform spectral density, this departure tends to be small. If one or more of the doppler channels contains signal, then there would be sizable departure from the regular "staircase", with larger steps occurring, as illustrated in FIG. 5b. In FIG. 5b, stairstep 520 includes an oversize step 522 when the power in the doppler channel corresponding to k=5 is added. The slope of the stairstep above k=5 is represented by dash line 524, and the slope below k=5 is represented by dash line 526. Dash lines 524 and 526 have equal slope in FIG. 5b, i.e. they are parallel lines. The deviation of stairstep 522 from a straight line having a slope equal to that of dash lines 524 or 526 is a measure of how equal the power in each channel is to the power in each of the other channels. The deviation of stairstep 522 from a straight line therefore indicates how closely the noise across the spectrum approaches flatness.

The $i^{th}$ two-sided Kolmogorov-Smirnov (KS) test statistic $T_{1i}$, described in the text PRACTICAL NONPARAMETRIC STATISTICS, by W.T. CONOVER, published by John Wiley & Sons, 1971, is generated in block 418 of FIG. 4:

$$T_{1i} = \max_k \left| \frac{k}{N_i} - F_i(k) \right|, k = 1, 2, \ldots N_i \quad (11)$$

where $k/N_i$ is the idealized slope of the stairstep, so $T_{1i}$ is the difference, at a particular value of k which maximizes the difference, between the active stairstep and its ideal slope. In FIG. 5b, there are eight increments of k, so the ideal slope is 1/8, which corresponds to dash line 526. The deviation at k=5 is the difference between stairstep 520 and slope 526, which is designated $T_{1i}$.

For each reduced order set of signals, $T_{1i}$ is generated in block 418 of FIG. 4, and compared in a block 420 with a selected threshold $w_{1-\alpha}$, selected as described below. Block 420 determines whether $T_{1i}$ exceeds $w_{1-\alpha}$. If $T_{1i}$ is greater than the selected value of $w_{1-\alpha}$, the YES output of block 420 directs the logic to a block 421, in which the current value of i is incremented to i+1, and a new iteration is started by again reducing the order of the samples in block 414. The iterations continue until test statistic $T_{1i}$ becomes less than or equal to $w_{1-\alpha}$. At this time, the noise level is known to the confidence level established by $w_{1-\alpha}$, and a signal is supplied from decision block 420 to an AND function 422, together with the values $S_{(k)}$ of the reduced order power density spectrum which resulted in the flatness test statistic $T_{1i}$ not exceeding the designated value of $w_{1-\alpha}$. The noise in each channel is simply the cumulative noise for all values of $N_i$, divided by $N_i$. It should be noted that the spectrum is "closed up" after each reduction with order of the set by block 414, in order to avoid dividing by an $N_i$ in which some of the values are zero. This calculation is performed in block 424 and the resulting value is applied over a data bus in common to the inverting inputs of all the summing circuits 212 of FIG. 2.

In order to determine the magnitude of threshold $w_{1-\alpha}$, two inputs must be available. One input is $N_i$, the number of samples in the reduced-order set currently being evaluated, and the other input is the confidence level 1-α, where α is the level of significance. FIG. 6 tabulates values of $w_{1-\alpha}$, for various confidence levels ranging from 0.80 to 0.99, and for values of N ranging from $N_i=1$ to $N_i=40$. For values of N greater than 40, the values of $w_{1-\alpha}$, may be approximated by $1.07/\sqrt{N_i}$, $1.22/\sqrt{N_i}$, $1.36/\sqrt{N_i}$, $1.52\sqrt{N_i}$, and $1.63\sqrt{N_i}$, for confidence levels of 0.80, 0.90, 0.95, 0.98 and 0.99, respectively. Block 426 of FIG. 4 may be implemented as a table look-up such as a ROM, which receives the current $N_i$ from block 414 as one address, and receives the confidence level 1-α from an operator input or from a ROM. The table look-up responds to each different current value of $N_i$ by supplying to block 420 the value of $w_{1-\alpha}$ tabulated in FIG. 6.

As an alternative to a table look-up for source 426 of $w_{1-\alpha}$, block 426 may be implemented to compute $$w_{1-\alpha} = K[N_i + 0.12 + 0.11/N_i]^{\frac{1}{2}}, \quad (12)$$

where K takes on the values 1.07, 1.22, 1.36, 1.52 and 1.63 for α=0.2, 0.1, 0.05, 0.02 and 0.01, respectively.

The KS test is a measure of the quality of the fit of an empirical probability distribution to a hypothesized probability distribution. It can be shown that the power density spectrum has the properties of a probability density function, and thus the integrated power spectrum has the properties of a probability distribution function.

The KS test has a significance level α, 0<α<1. A hypothesis H is tested with a confidence interval $w_{1-\alpha}$ such that, if the KS test statistic $T_1$ exceeds $w_{1-\alpha}$, the hypothesis is rejected with the statement that the probability the H is correct is less than 1-α. When values of α such as 0.01, 0.05, 0.1 and 0.2 are used, the KS test is stringent. Conversely, if the progenitor KS test statistic $T_1$ does not exceed $w_{1-\alpha}$, the probability is 1-α that hypothesis H is true.

Figure 1:
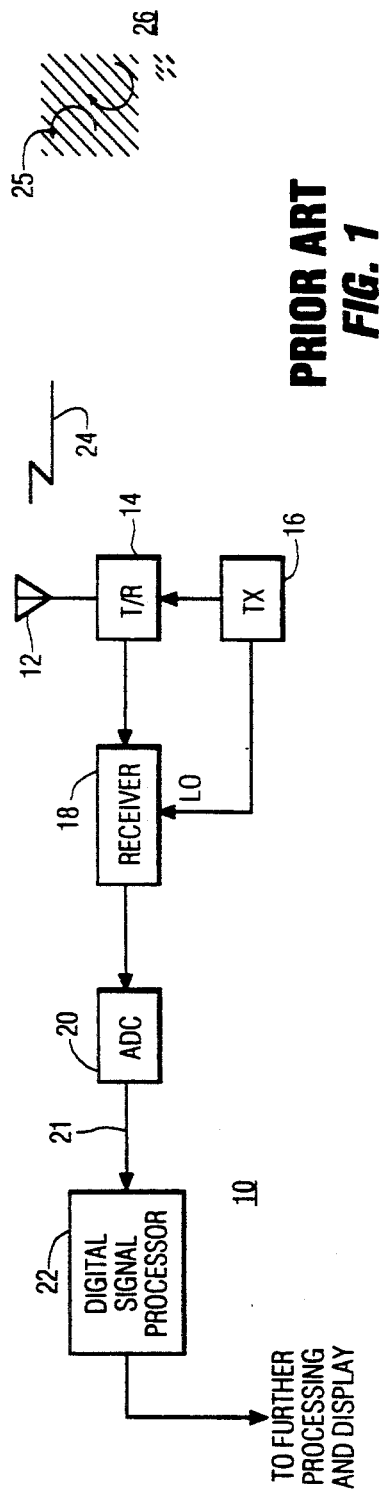
FIG. 1 is a simplified block diagram of a portion of a radar system.

Other embodiments of the invention will be apparent to those skilled in the art. For example, a sonar system may use the abovedescribed principles, but, of course, antenna 12 of FIG. 1 is replaced by a transducer for transmitting and receiving pressure variations in a fluid.

What is claimed is:

1. A ranging system for detecting velocity constituents of fluid phenomena, comprising:

transmitting means for transmitting sequences of pulses toward at least one phenomenon, whereby echoes of said pulses are generated;

receiving means for receiving said echoes and for generating received signals representing said echoes;

doppler filter means coupled to said receiving means for separating said echoes into a plurality of doppler frequency components, each of said plurality of doppler frequency components being contaminated by noise, including system and fluid medium noise;

squaring means coupled to said doppler filter means for squaring the magnitudes of each of said doppler frequency components to produce squared signals;

amplitude ordering means for ordering said squared signals in accordance with their amplitudes, from smallest to largest, to produce ordered signals;

truncating means coupled to said amplitude ordering means for deleting at least a largest amplitude one of said ordered signals, to produce reduced-order signals;

testing means coupled to said amplitude ordering means and to said truncating means for receiving said reduced-order signals, and for applying a KS test to said reduced-order signals to determine whether a KS test statistic exceeds a predetermined value, and for, if said KS test statistic exceeds said predetermined value, discarding at least the largest one of the remaining ones of said reduced-order signals, and for recurrently applying said KS test to said reduced ordered signals, and for, if said KS test statistic does not exceed said predetermined value, deeming the noise level to be equal to that represented by the current reduced-order signals; and subtracting means coupled to said testing means for subtracting from each of said doppler frequency components the corresponding value of said noise, to produce doppler frequency components having reduced noise.

2. A system according to claim 1, wherein said testing means comprises:

means for forming signals representative of the cumulative frequency power distribution represented by said reduced-order signals, normalized to its maximum value.

3. A system according to claim 2, wherein said testing means further comprises means for forming the difference between said cumulative frequency power distribution and its ideal slope.

4. A system according to claim 2, further comprising means for determining the maximum value of the difference between said cumulative frequency distribution and said ideal slope.

5. A system according to claim 1, wherein said testing means comprises comparison means for comparing said KS test statistic with said predetermined value; and further comprising means for generating said predetermined value in response to the number of said reduced-order signals and the desired level of significance.

6. A system according to claim 5, wherein said means for generating said predetermined value comprises addressable memory means with stored predetermined values, which are accessed by addressing said memory means with a representation of said number of said reduced-order signals and a representation of said desired level of significance.

7. A system according to claim 1, wherein said transmitting means comprises an electromagnetic antenna.

8. A method for detecting velocity constituents of diffuse targets, comprising the steps of:

transmitting sequences of pulses toward said target, to thereby produce echoes;

receiving said echoes and translating said echoes into signals representative of said echoes;

doppler filtering said signals representative of said echoes to produce a plurality of doppler frequency components, each of which frequency components may be contaminated by noise;

squaring the magnitudes of each of said frequency components to produce squared signals;

ordering said squared signals in accordance with the amplitude they represent, from lowest to highest, to produce ordered signals;

discarding the largest $M-N_i$ of said ordered signals to produce a reduced-order set of signals;

calculating a KS test statistic from said ordered signals and said reduced-order set;

comparing said test statistic with a predetermined threshold;

if said test statistic exceeds said threshold, repeating said steps of discarding and calculating a KS test statistic;

if said test statistic does not exceed said threshold, deeming the noise spectral density to have been found, and calculating from said noise spectral density the noise associated with each of said doppler frequency components to produce calculated noise; and subtracting from said doppler frequency components said calculated noise.

9. A method according to claim 8, wherein said step of transmitting includes the step of transmitting electromagnetic signals.

10. A method according to claim 8 wherein said step of doppler filtering includes the step of performing a discrete Fourier transform.

11. A method according to claim 8 wherein said step of calculating a KS test statistic includes the step of:

forming signals representative of the cumulative frequency power distribution of said reduced-order signals.

12. A method according to claim 11, wherein said step of calculating a KS test statistic includes the step of taking the difference between said cumulative frequency power distribution and an ideal slope of said cumulative frequency power distribution.

13. A method according to claim 12, wherein said step of calculating a KS test static includes the step of establishing the maximum value of said difference.

14. A method according to claim 8, wherein said step of comparing said test statistic includes the step of generating said threshold from the number of samples in the current reduced-order set and from a desired level of significance.

* * * * *